United States Patent
Schmitt

(10) Patent No.: US 9,669,676 B2
(45) Date of Patent: Jun. 6, 2017

(54) METHOD FOR OPERATING AN ELECTROMAGNETIC ACTUATOR IN A MOTOR VEHICLE

(71) Applicant: Audi AG, Ingolstadt (DE)

(72) Inventor: Joachim Schmitt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/024,665

(22) PCT Filed: Jul. 26, 2014

(86) PCT No.: PCT/EP2014/002043
§ 371 (c)(1),
(2) Date: Mar. 24, 2016

(87) PCT Pub. No.: WO2015/043693
PCT Pub. Date: Apr. 2, 2015

(65) Prior Publication Data
US 2016/0229250 A1    Aug. 11, 2016

(30) Foreign Application Priority Data

Sep. 25, 2013  (DE) ......................... 10 2013 015 984

(51) Int. Cl.
*B60G 17/015*    (2006.01)
*B60K 5/12*      (2006.01)
*B60G 21/055*    (2006.01)

(52) U.S. Cl.
CPC ..... *B60G 17/0157* (2013.01); *B60G 21/0555* (2013.01); *B60K 5/1283* (2013.01);
(Continued)

(58) Field of Classification Search
None
See application file for complete search history.

(56) References Cited

U.S. PATENT DOCUMENTS

| 5,409,078 A | 4/1995 | Ishioka et al. |
|---|---|---|
| 9,108,482 B2 | 8/2015 | Mohrlock et al. |

(Continued)

FOREIGN PATENT DOCUMENTS

| DE | 41 04 168 | 4/1992 |
|---|---|---|
| DE | 100 52 765 | 7/2001 |

(Continued)

OTHER PUBLICATIONS

Research Disclosure: Coordination of Engine Mount with Controlled Suspension, Emsworth, Great Britain, 1992.

(Continued)

*Primary Examiner* — Adam Tissot
*Assistant Examiner* — Tamara Weber
(74) *Attorney, Agent, or Firm* — Henry M. Feiereisen LLC.

(57) ABSTRACT

A method for operating an actuator of a torsion bar system of a wheel suspension of a motor vehicle is disclosed. The actuator is mounted on a carrier structure of the vehicle and actuation of the actuator changes a pre-tension acting on a wheel guide element of the wheel suspension. The method includes controlling an active aggregate support so as to reduce a vibration of a drive aggregate supported on the carrier structure via the active aggregate support adjacent to the actuator; and controlling the active aggregate support for reducing an operational vibration of the actuator.

16 Claims, 3 Drawing Sheets

(52) U.S. Cl.
CPC .... *B60G 2202/442* (2013.01); *B60G 2204/18* (2013.01); *B60G 2204/19* (2013.01); *B60G 2204/41062* (2013.01); *B60G 2600/44* (2013.01); *B60G 2800/87* (2013.01)

(56) References Cited

U.S. PATENT DOCUMENTS

| | | | |
|---|---|---|---|
| 9,205,874 | B2 | 12/2015 | Mohrlock et al. |
| 2005/0056981 | A1* | 3/2005 | Nemoto ................ F16F 13/264 267/140.13 |
| 2005/0284713 | A1 | 12/2005 | Fischer |
| 2006/0169518 | A1 | 8/2006 | Thomas et al. |
| 2010/0198457 | A1* | 8/2010 | Hermann ............. B60K 5/1283 701/36 |
| 2012/0280465 | A1 | 11/2012 | Meitinger et al. |
| 2014/0046502 | A1 | 2/2014 | Schmitt |
| 2014/0232083 | A1 | 8/2014 | Mohrlock et al. |
| 2014/0319787 | A1 | 10/2014 | Mohrlock et al. |
| 2014/0358366 | A1* | 12/2014 | Lee ...................... B60K 5/1283 701/36 |

FOREIGN PATENT DOCUMENTS

| | | | |
|---|---|---|---|
| DE | 102 33 783 | 2/2004 | |
| DE | 102004030935 | 9/2005 | |
| DE | 102004015036 | 10/2005 | |
| DE | 102007014242 | 9/2008 | |
| DE | 102009005899 | 7/2010 | |
| DE | 102009051468 | 5/2011 | |
| DE | 102011106246 | 1/2013 | |
| DE | 102011106246 A1 * | 1/2013 | ........... B60G 17/025 |
| EP | 0 464 598 | 1/1992 | |
| EP | 0 470 064 | 2/1992 | |
| WO | WO 2005/001308 | 1/2005 | |

OTHER PUBLICATIONS

International Search Report issued by the European Patent Office in International Application PCT/EP2014/002043 on Sep. 29, 2014.

* cited by examiner

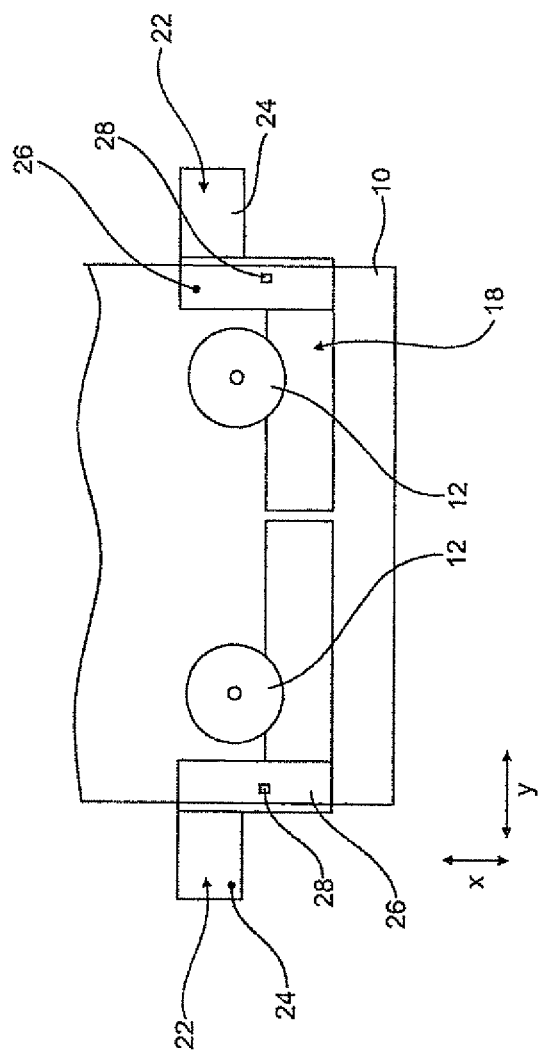

METHOD FOR OPERATING AN ELECTROMAGNETIC ACTUATOR IN A MOTOR VEHICLE

CROSS-REFERENCES TO RELATED APPLICATIONS

This application is the U.S. National Stage of International Application No. PCT/EP2014/002043, filed Jul. 26, 2014, which designated the United States and has been published as International Publication No. WO 2015/043693 and which claims the priority of German Patent Application, Serial No. 10 2013 015 984.9, filed Sep. 25, 2013, pursuant to 35 U.S.C. 119(a)-(d).

BACKGROUND OF THE INVENTION

The present invention relates to a method for operating an electromagnetic or hydraulic actuator in a motor vehicle according to the preamble of patent claim 1 and a device for performing the method according to claim 8.

From DE 10 2011 106 246 A1 a generic electromagnetic actuator is known which is used in a chassis of a motor vehicle in order to in particular enable interventions regarding driving dynamics. The actuator is part of a torsion bar system in which on each side of the vehicle a torsion bar, which can be variably pre-tensioned via a motor-transmission-unit or an actuator, acts via an output lever on a respective wheel suspension element of the wheel suspension on each side of the motor vehicle. The torsion bar system forms an active rotary actuator or stabilizer, which, acting as accumulator spring, at the same time enables adjusting the elevation of the vehicle body and counteracts rolling an pitching. During driving such actuators are subjected to a highly dynamic loads and high rotational speeds and may thus represent disturbing noise sources.

In the state of the art the operational vibrations of the actuator are damped by a correspondingly configured elastic support or a vibration damper whose damping capacity is limited however.

Generally, active aggregate carriers are for example known from DE 10 2004 015 036 B4, which for example have a hydraulic damping and whose damping characteristics can be electrically adjusted for different vibration excitations and vibration amplitudes and can thus in particular effectively dampen low frequency excitations. In such an active support system an actuator system of the aggregate support is controlled with an actuating signal in order compensate vibrations of the aggregate during driving to the most degree.

SUMMARY OF THE INVENTION

It is an object of the invention to provide a method and a device for implementing the method with which vibration and noise of electromechanical actuators can be reduced almost without any additional costs.

The object is solved by the features of the independent claims. Advantageous refinements of the method and a particularly preferred device for implementing the method are set forth in the dependent claims.

According to the invention it is proposed that the aggregate supports are also controlled for damping vibration excitations of the torsion bar system. By correspondingly coordinating and controlling the aggregate supports, in particular in the higher frequency range, it is possible to use the damping characteristic of the aggregate supports for suppressing or eliminating noise and/or vibrations originating from the actuators.

Particularly preferably, the counter vibrations of the drive aggregate can be superimposed over the vibrations of the torsion bar system. By selecting the appropriate type of elastomer (support body) used in the aggregate supports and the controllable throttle effects (in the case of hydraulic aggregate supports) row frequency vibrations of the aggregate (in particular of an internal combustion engine) can be damped and a dynamic stiffness can be generated in the typical frequency range of the actuator, which at least reduce the vibration excitation of the actuator by phase shifted counter vibrations.

In a control-based realization a control unit can detect the drive aggregate vibration during driving as a first actual interfering signal. Based on the detected interfering signal the control unit generates a first actuating signal with which the actuator system of the aggregate support is controlled for reducing the first interfering signal. In addition the control unit can detect an operational vibration of the electromechanical actuator as a second actual interfering signal. Based on this second interfering signal the control unit generates a second actuating signal with which the actuator system of the aggregate support is controlled for reducing the second interfering signal.

For detecting the above-mentioned second interfering signal at least one vibration sensor can be arranged on the electromagnetic actuator, whose signals are analyzed in the control unit for additionally controlling the aggregate support.

The control unit can be a motor control unit, which is already present in the motor vehicle and in which driving-dynamics and aggregate-specific parameters (load state, rotational speed etc.) are detected and the aggregate supports are controlled as a function of these data.

Further, the control signals of the electromagnetic actuator can at the same time be used for additionally controlling the active aggregate supports so that an adequate vibration damping can be realized also without using sensors. For this the control of the aggregate support can particular advantageously be empirically determined in dependence on the control signals of the electromagnetic actuator and stored in a control device.

For performing the method it is in particular proposed that aggregate supports for supporting a drive aggregate of the motor vehicle whose damping characteristics can be actively adjusted are arranged on the vehicle superstructure or on a subframe spatially close to at least one electromagnetic actuator, in particular a torsion bar system acting on wheel guiding elements of the wheel suspensions of the motor vehicle, and that the aggregate supports are controlled by means of an electronic control device for damping the vibration excitations of the actuator.

Further, at least one vibration detecting sensor can be provided on the electromechanical actuator, whose signals can be fed to the control device for controlling the active aggregate support.

The torsion bar system can have a respective actuator consisting of an electric motor and at least one transmission for each wheel suspension, which act on at least one rotary spring so as to change the pretension of the rotary spring, wherein for each actuator a sensor is provided and the sensors are connected with the control device. Depending on the circumstances the signals of the two sensors can hereby be analyzed separate from each other, wherein only the aggregate support which is closest to the respective actuator is controlled via the control device.

The electromagnetic actuator or the torsion bar system can also be fixedly connected, in particular screwed to, the subframe of the motor vehicle, on which also the drive aggregate is at least partially supported via the active aggregate supports. This has the advantage of a simple fastening without vibration damping means and in addition improves response characteristics of the torsion bar system.

The advantageous refinements and/or embodiments of the invention explained above or set forth in the dependent claims can be used individually or in any combinations—except in the cases of clear dependencies.

BRIEF DESCRIPTION OF THE DRAWING

In the following the invention and its advantageous embodiments and refinements and its advantages are explained in more detail by way of drawings.

It is shown in

FIG. 3 The torsion bar system and the aggregate supports in a view from above.

DETAILED DESCRIPTION OF PREFERRED EMBODIMENTS

Figure 1:
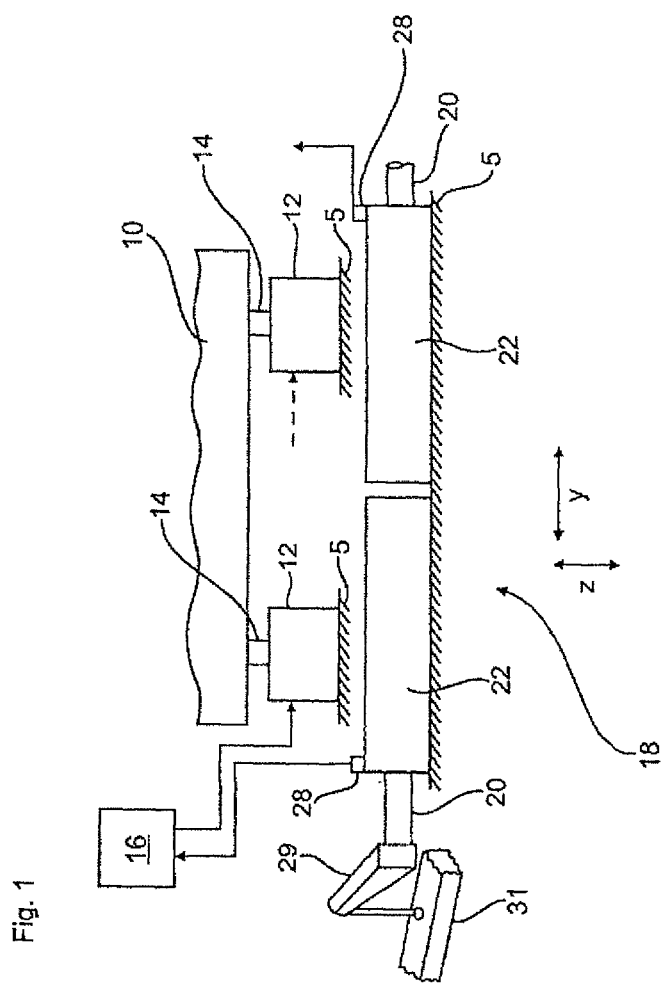
FIG. 1 a schematic illustration of a torsion bar system for the wheel suspension of a motor vehicle, whose actuators on both sides are positioned close to active aggregate supports for supporting a drive aggregate and carry vibration absorbing sensors, which are connected with an electronic motor control unit which controls the aggregate supports.

FIGS. 1 and 3 schematically illustrate a drive aggregate, in particular an internal combustion engine 10, shown in outline, which in the present case is supported in the region of interest on an indicated carrier structure 5 of the vehicle, for example a subframe, via two aggregate supports 12 arranged on both sides, and via corresponding motor supports 14 in a vibration isolated manner. The subframe is usually connected with the superstructure of the motor vehicle via vibration damping supports, while the housings of the aggregate supports 12 are fixedly screwed to the subframe.

The active aggregate supports 12 can be constructed as hydraulically actuated supports of known type, whose damping characteristics, controlled via an electronic control device, in particular a control device 16 present in the vehicle, can be adjusted between low-frequency and high-frequency vibration excitation.

In addition a torsion bar system 18 is fastened on the carrier structure 5, which is formed by two torsion bars 20, which are separated in the center of the vehicle and are arranged transverse to the longitudinal direction of the vehicle, and two electromagnetic actuators 22 arranged on either side.

As mentioned above the torsion bars 20 and the actuator 22 can be configured as disclosed in the aforementioned DE 10 2009 005 899 A1, wherein the actuators 22 can be formed by an axially parallel electric motor 24 (FIG. 3) and at least one transmission, for example a belt drive 26.

The torsion bars 20 are drivingly connected with the transmission 26 and are articulately connected via a respective output lever 29 with the wheel guide element 31 of the wheel suspension of the motor vehicle arranged on both sides By controlling the electric motors 24, of the actuators 22, the pre-tension of the torsion bars 20 which act as accumulator springs to a suspension spring of the wheel suspensions can be changed for compensating rolling and pitching of the body of the motor vehicle, wherein the actuators 22 are correspondingly subject to dynamic and relatively high actuator loads.

The active aggregate supports 12 are positioned close to the actuators 22 of the torsion bar system 18 fastened on the subframe (FIG. 1 or 3). This makes it possible to use the adjustable vibration damping characteristic of the aggregate supports 12 additionally for reducing noise transmitted to the vehicle body or vibrations by the actuators 22.

For this purpose vibration sensors 28 in signal communication with the motor control device 16 are preferably provided on the actuators 22 in the region of the transmissions 26 (FIG. 1).

The motor control device 16 is provided in a known manner with motor-specific and driving-specific data such as load, rotational speed of the internal combustion engine and speed, steering angle, transverse acceleration etc. in order to control among other things the active aggregate supports 12 and to change their vibration characteristics.

In addition the motor control device 16 is modified so as to additionally control the active aggregate supports 12 and adjust their vibration damping characteristics in case of relevant operating states of the actuators 22 with corresponding vibration excitation, which are detected via the vibration sensors 28 and are provided to the motor control device 16.

This can be accomplished by configuring and adjusting the functional parts of the aggregate supports 12 so that a dynamic stiffness is generated in the frequency range of the actuators 22, which transmits counter vibrations of the drive aggregate 10 between the subframe or the actuators 22 fixedly connected with the subframe, which counter vibrations are phase-shifted by 180° and extinguish the vibrations originating from the actuators 22 or eliminate the transmission of noise and/or vibrations.

Figure 2:
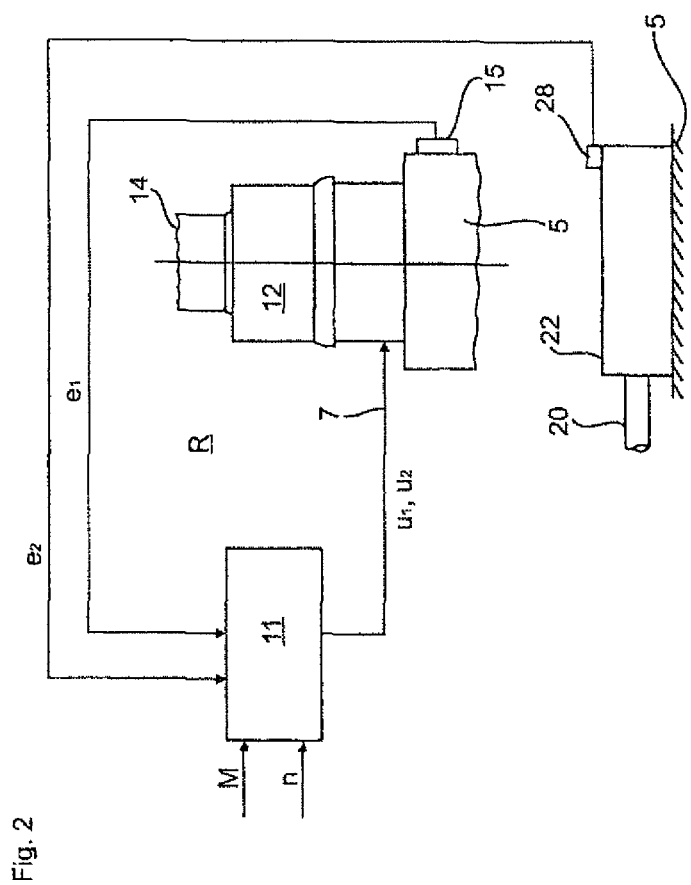
FIG. 2 a control circuit for implementing the method according to the invention.

FIG. 2 exemplary shows a control based realization of the invention. Accordingly the not shown drive aggregate 10 is supported via the motor support 14 on the carrier structure 5 of a vehicle body by interposing the active aggregate support 12. The aggregate support 12 has for example a not shown hydraulic chamber with an electrodynamic actuator, which can be electrically controlled by the control unit 16.

The control unit 11, the actuator system and an error sensor 15 arranged on the bearing foot of the aggregate support 12 on the vehicle body together with the aggregate support 12 (control loop) form a control circuit R. the control circuit R controls the actuator system so that the aggregate support 12 is impinged with a counter vibration with which an operation-related motor vibration can be compensated to the most degree. Via the error sensor 15 an actual interfering signal $e_1$ is returned to the control unit 11. In addition the control unit 11 has a signal input for a motor moment M and a signal input for the motor rotational speed n. The control unit 11 generates the actuating signal $u_1$ which represents the counter vibration, and with which the actuator system of the aggregate support 12 is controlled.

In addition a sensor 28 is integrated in the control circuit R shown in FIG. 2 for detecting an operational vibration of the actuator 22. The operational vibration detected by the sensor 28 forms a second interfering signal $e_2$ based on which the control unit 11 generates a second actuating signal $u_2$. With the second actuating signal $u_2$ the actuator system of the aggregate support 12 is also controlled in order to reduce the second interfering signal $e_2$, i.e., the operational vibration of the actuator 22.

As a result of the measure according to the invention the torsion bar system 18 can be fixedly connected with the subframe without disturbing noise transmission, which beside the simple fastening (no noise-damping means) provides improved response characteristics of the system.

Depending on the circumstances the left and the right vibration sensor 28 can be analyzed separate from each other in the motor control unit 16 and only the left or the right aggregate support 12 is correspondingly controlled.

In contrast to the described method, characteristic curves may be stored in the motor control unit 16, which based on the motor-specific and drive-specific data recognize the operating states of the motor vehicle, in which the actuators 22 cause relevant vibration excitations, which are then removed or are at least reduced by controlling the active aggregate supports 12. The mentioned data or characteristic curves can for example be determined empirically. The vibration sensors 28 may then be omitted.

The aggregate supports 12 and the torsion bar system 18 with the torsion bars 20 and the actuators 22 may also be arranged different from the described embodiment directly on the superstructure of the motor vehicle.

In the exemplary embodiment above, two actuators 22 are used for each side of the vehicle. However, the invention is not limited to this exemplary embodiment. Rather the torsion bar system 18 may also be configured as a roll stabilizer which operates with only one actuator 22, which is operatively connected with two stabilizer halves. In addition, in contrast to the shown exemplary embodiment, the electric motor 24 can be directly connected on the housing of the actuator 22 via a motor bearing with appropriate transmission behavior.

The invention claimed is:

1. A method for operating an actuator of a torsion bar system of a wheel suspension of a motor vehicle, wherein said actuator is mounted on a carrier structure of the vehicle and wherein actuation of the actuator changes a pre-tension acting on a wheel guide element of the wheel suspension, said method comprising:
   controlling an active aggregate support so as to reduce a vibration of a drive aggregate supported on the carrier structure via the active aggregate support adjacent to the actuator; and
   controlling the active aggregate support for reducing an operational vibration of the actuator.

2. The method of claim 1, further comprising detecting with a control unit the vibration of the drive aggregate occurring during a drive as a first actual interfering signal, generating with the control unit a first actuating signal as a function of a first actual interfering signal, and controlling an actuating system of the active aggregate support with the first actuating signal for reducing the first actual interfering signal.

3. The method of claim 2, further comprising detecting with the control unit an operational vibration of the actuator as a second actual interfering signal, generating with the control unit a second actuating signal, and controlling an actuating system of the active aggregate support with the second actuating signal for reducing the second actual interfering signal.

4. The method of claim 3, further comprising superimposing the first and second actuating signals over each other in a parallel operation.

5. The method of claim 3, wherein the first actuating signal is a low-frequency counter vibration of the drive aggregate vibration and the second actuating signal is a high-frequency counter vibration of the operational vibration of the actuator.

6. The method of claim 1, further comprising superimposing with the active aggregate support a counter vibration of the drive aggregate over the operational vibration of the actuator.

7. The method of claim 1, further comprising analyzing with a control unit a signal of at least one vibration sensor assigned to the actuator, for controlling the active aggregate supports.

8. The method of claim 1, wherein the control unit is a motor control unit in which driving dynamic and aggregate-specific parameters are detected and wherein the active aggregate support is controlled as a function of the driving dynamic and aggregate-specific parameters.

9. The method of claim 1, wherein the controlling of the active aggregate support is determined empirically in dependence on a control signal of the actuator and is stored in the control unit.

10. A device, comprising:
    an electromechanical actuator, said electromechanical actuator being part of a torsion bar system of a wheel suspension of a motor vehicle and being mounted on a carrier structure of the motor vehicle, wherein actuation of the electromechanical actuator changes a pre-tension acting on a wheel guide element of the wheel suspension;
    an active aggregate support for supporting a drive aggregate of the motor vehicle, said active aggregate support being arranged on the carrier structure of the motor vehicle in close proximity to the actuator, said active aggregate support being adapted for active adjustment of damping characteristics of the active aggregate support; and
    a control unit adapted for controlling the active aggregate support so as to dampen an operational vibration of the actuator.

11. The device of claim 10, further comprising at least one vibration sensor provided on the electromechanical actuator, said control unit being adapted for receiving signals generated by the vibration sensor, and for controlling the active aggregate support based on the signals generated by the at least one vibration sensor.

12. The device of claim 11, further comprising two said vibration sensors, wherein the control unit is adapted for analyzing the signals of the two vibration sensors separate from each other and to only control a respective one of the active aggregate supports closest to the respective electromechanical actuator.

13. The device of claim 10, wherein the electromechanical actuator comprises an electric motor and at least one transmission, said electric motor and said at least one transmission acting on at least one torsion bar so as to change a pre-tension of the at least one torsion bar, said device further comprising a vibration sensor for each said electromechanical actuator, said vibration sensor being connected with the control unit.

14. The device of claim 10, wherein the electromechanical actuator or the torsion bar system is fixedly connected with the carrier structure, and wherein the drive aggregate is at least partially supported on the carrier structure via the active aggregate support.

15. The device of claim 14, wherein the carrier structure is a subframe of the motor vehicle.

16. The device of claim 10, wherein the electromechanical actuator is screwed to the carrier structure.

* * * * *